United States Patent
Flamanc

(10) Patent No.: US 9,475,509 B2
(45) Date of Patent: Oct. 25, 2016

(54) GUIDED GROUND VEHICLE INCLUDING A DEVICE FOR MANAGING A DERAILMENT OF THE VEHICLE, AND ASSOCIATED DERAILMENT MANAGEMENT METHOD

(71) Applicant: Alstom Transport Technologies, Levallois Perret (FR)

(72) Inventor: Emmanuel Flamanc, Bois d'Arcy (FR)

(73) Assignee: Alstom Transport Technologies, Levallois Perret (FR)

( * ) Notice: Subject to any disclaimer, the term of this patent is extended or adjusted under 35 U.S.C. 154(b) by 55 days.

(21) Appl. No.: 14/567,884

(22) Filed: Dec. 11, 2014

(65) Prior Publication Data

US 2015/0158507 A1  Jun. 11, 2015

(30) Foreign Application Priority Data

Dec. 11, 2013  (FR) ..................................... 13 62420

(51) Int. Cl.
| | |
|---|---|
| B61F 9/00 | (2006.01) |
| B60T 7/12 | (2006.01) |
| B61L 15/00 | (2006.01) |

(52) U.S. Cl.
CPC .............. B61F 9/005 (2013.01); B60T 7/124 (2013.01); B61F 9/00 (2013.01); B60T 7/12 (2013.01); B61L 15/0081 (2013.01)

(58) Field of Classification Search
CPC ...... B60T 7/124; B60T 7/12; B61L 15/0081; B61F 9/005; B61F 9/00
See application file for complete search history.

(56) References Cited

U.S. PATENT DOCUMENTS 3,288,992 A * 11/1966 Matsudaira ............... B61L 1/20
                                                                                   137/38
3,994,459 A * 11/1976 Miller ...................... B61F 9/005
                                                                                    246/173
6,860,453 B2 * 3/2005 Moretti .................... B60T 7/124
                                                                                 246/169 R
8,262,172 B2 * 9/2012 Jimenez ................ B60T 17/228
                                                                                     246/170
9,139,209 B2 * 9/2015 Smileski ............. B61L 15/0081

(Continued)

FOREIGN PATENT DOCUMENTS

| | | |
|---|---|---|
| EP | 2253523 A1 | 11/2010 |
| FR | 513374 A | 2/1921 |

(Continued)

OTHER PUBLICATIONS

Search Report for application No. FR 01 10435, relative to FR 13 62420, dated Jul. 5, 2007, 2 pages.

*Primary Examiner* — Jason Holloway
(74) *Attorney, Agent, or Firm* — Reising Ethington P.C.

(57) ABSTRACT

A guided ground vehicle that travels on a track having an electric contact rail for supplying electricity to the vehicle, the rail including several electrical circuits, each electrical circuit being connected to at least one electric switching member. The vehicle includes a device for managing a derailment of the ground vehicle and generating means for generating a control signal for controlling one of the electric switching members connected to the electrical circuits positioned across from the ground vehicle, to close that electrical circuit. The device includes detecting means for detecting the derailment of the ground vehicle and processing means connected to the detecting means and to the generating means. The processing means are adapted to deactivate the generating means to inhibit the generation of the control signal, in order to cause the opening of the circuits across from the vehicle.

12 Claims, 4 Drawing Sheets

(56) References Cited

U.S. PATENT DOCUMENTS

| | | | | |
|---|---|---|---|---|
| 2002/0139903 A1* | 10/2002 | Nico | B60T 7/124 246/170 |
| 2003/0178532 A1* | 9/2003 | Moretti | B60T 7/124 246/169 R |
| 2006/0122745 A1* | 6/2006 | Lueger | B61F 9/005 701/19 |
| 2008/0156944 A1* | 7/2008 | Aurich | B60T 8/321 246/182 C |
| 2008/0190713 A1* | 8/2008 | Jimenez | B60T 17/228 188/33 |

FOREIGN PATENT DOCUMENTS

| | | |
|---|---|---|
| FR | 2715119 A1 | 7/1995 |
| FR | 2759340 A1 | 8/1998 |
| FR | 2846917 A1 | 5/2004 |
| FR | 2909061 A1 | 5/2008 |

\* cited by examiner

GUIDED GROUND VEHICLE INCLUDING A DEVICE FOR MANAGING A DERAILMENT OF THE VEHICLE, AND ASSOCIATED DERAILMENT MANAGEMENT METHOD

BACKGROUND

The present invention relates to a method for managing a derailment of a guided ground vehicle traveling on a track, the track comprising an electric contact rail for supplying electricity to the vehicle via the ground, the rail including a plurality of electrical circuits, each electrical circuit being connected to at least one electric switching member.

The method is implemented by an onboard device within the vehicle, the device including detecting means for detecting the derailment of the ground vehicle and processing means connected to the detecting means, the vehicle including generating means for generating a control signal for controlling the or one of the electric switching member(s) connected to the or one of the electrical circuits positioned across from the ground vehicle, to close said electrical circuit, the generating means being connected to the processing means.

The method includes a step for detecting, by the detecting means, the derailment of the ground vehicle.

A guided vehicle refers to a vehicle guided either by the contact rail, or by the running rails of the vehicle, or guided freely by a driver to position the vehicle above a contact rail. A derailment refers to the fact that the vehicle is derailed or out of alignment relative to the contact rail.

The present invention also relates to a guided ground vehicle able to travel on a track, the vehicle including a device for managing a derailment of the vehicle implementing such a method.

The present invention also relates to a set including a plurality of such guided ground vehicles.

The field of the invention is that of guided ground vehicles, in particular that of tramways intended to travel on railroad tracks in urban areas.

A method is known for managing a derailment of a guided ground vehicle traveling on a track. The track comprises an electrical contact rail powering the vehicle through the ground. The rail includes several electrical circuits, each electrical circuit being connected to at least one electric switching member. At any time, at least one of the electrical circuits positioned across from the vehicle is closed, allowing electricity to be conducted within that circuit. If the vehicle derails, the driver of the vehicle presses a member actuating an emergency brake of the vehicle. However, such a management method using "manual" derailment detection is not reliable. In fact, the driver of the vehicle may have been injured and/or rendered unconscious following the derailment, the driver then becoming unable to press the actuating member.

To solve this problem, known from document EP 2,253, 523 A1 is a railroad vehicle including a device for managing a derailment of the vehicle implementing a method of the aforementioned type. The detecting means for detecting the derailment include a member measuring a distance between a braking device of the vehicle and one of the rails of the track. The method includes, following the step for detecting the derailment, a step for activating an alarm and/or an emergency brake if the measured distance is outside a predetermined safety range.

However, in the case of a guided ground vehicle powered electrically via the ground, the implementation of such a method may not address certain risks that arise in the event of derailment.

SUMMARY OF THE INVENTION

One aim of the invention is therefore to propose a method for managing a derailment of a guided ground vehicle adapted to improve the safety of pedestrians located near the track when the vehicle derails, while ensuring reliable detection of the derailment.

To this end, the invention relates to a method for managing the derailment of the aforementioned type, wherein after the detection, by the detecting means, of the derailment of the vehicle, the method further includes a step for using the processing means to deactivate the generating means, so as to inhibit the generation of the control signal, in order to cause the opening of the circuit(s) across from the vehicle.

According to other advantageous aspects of the invention, the method for managing the derailment includes one or more of the following features, considered alone or according to any technically possible combination(s):

- the generating means include at least one transmission antenna for transmitting the control signal and one electrical power supply module for supplying electric power to the antenna, and during the deactivation step, the processing means are adapted to generate a control signal to stop the electrical power supply module;
- the vehicle comprises visual and/or sound alert means for alerting inside and/or outside the vehicle, connected to the processing means, and the method further includes a step for generating, by the processing means, a control signal for controlling said alert means, and for sending said signal to the alert means after the detection of the derailment of the vehicle;
- the vehicle comprises braking means for braking the vehicle, connected to the processing means, and the method further includes a step for generating, by the processing means, a braking control signal, the step for generating a braking control signal being carried out after the step for generating a control signal for the visual and/or sound alert means inside the vehicle;
- the vehicle comprises storage means for storing electricity, connected to the processing means, and the method further includes a step for generating, by the processing means, a control signal to discharge the electricity contained in the storage means, and for sending said signal to the storage means after the detection of the derailment of the vehicle; and
- the vehicle comprises communication means, connected to the processing means, and the method further includes a step for elaborating, by the processing means, a message indicating the derailment of the vehicle, and for sending said message to the communication means after the detection of the derailment of the vehicle.

The invention also relates to a guided ground vehicle able to travel on a track, the track comprising an electrical contact rail of the vehicle supplying electricity via the ground, the rail including a plurality of electrical circuits, each electrical circuit being connected to at least one electric switching member, the vehicle including a device for managing a derailment of the vehicle and generating means for generating a control signal for controlling the electric switching member(s) connected to one or more electrical circuits positioned across from the ground vehicle, to close said electrical circuit, the device including detecting means for detecting the derailment of the ground vehicle and processing means connected to the detecting means and the generating means, wherein the processing means are adapted to deactivate the generating means to inhibit the generation of the control signal, in order to cause the opening of the circuit(s) across from the vehicle.

According to another advantageous aspect of the invention, the vehicle includes the feature that the vehicle comprises communication means, connected to the processing means, and the processing means are adapted to elaborate a message indicating the derailment of the vehicle and to send this message to the communication means after the detection, by the detecting means, of the derailment of the vehicle.

The invention also relates to a set including a plurality of guided ground vehicles able to travel on a track and an installation for managing the travel of each guided ground vehicle, the track comprising an electrical contact rail supplying electricity to the or each vehicle via the ground, the rail including a plurality of electrical circuits, each electrical circuit being connected to at least one electric switching member, the installation including a remote communication center, wherein each guided ground vehicle is as defined above, each guided ground vehicle being adapted to communicate with the remote communication center via a data link, the communication means of each guided ground vehicle being adapted to send a message indicating the derailment of the vehicle to the remote communication center via the data link.

According to other advantageous aspects of the invention, the assembly includes one or more of the following features, considered alone or according to any technically possible combination(s):
- the installation further includes a plurality of signaling devices, each signaling device having a signaling state from among a plurality of predetermined signaling states, and in that the remote communication center comprises control means for controlling each signaling device, the control means being adapted to generate a signal modifying the signaling state of at least one of the signaling devices, based on the receipt of a message indicating the derailment of the vehicle;
- the installation further includes a power supply system for supplying electric power to the electrical circuits of the contact rail, and the remote communication center comprises control means for controlling the power supply system, the control means being adapted to generate a control signal to stop the power supply system, based on the receipt of a message indicating the derailment of the vehicle; and
- the remote communication system comprises location means for locating each guided ground vehicle, and transceiver means for sending the location of a guided ground vehicle that has derailed to other guided ground vehicles.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF ILLUSTRATED EMBODIMENTS

In this document, "derailment" refers to any situation in which at least one of the wheels of the guided ground vehicle is no longer stably engaged on one of the rails of the track. This for example includes a complete derailment situation, in which the wheel is completely disengaged from the corresponding rail, as well as a partial derailment situation, in which the wheel, although still in contact with the corresponding rail, is nevertheless in an abnormal position, which may lead to the complete derailment situation. "Derailment" also refers to the situation in which a vehicle is out of alignment relative to the contact rail situated below the vehicle.

In the rest of the description, the expression "substantially equal to" defines a relationship of equality to within plus or minus 10%.

Figure 1:
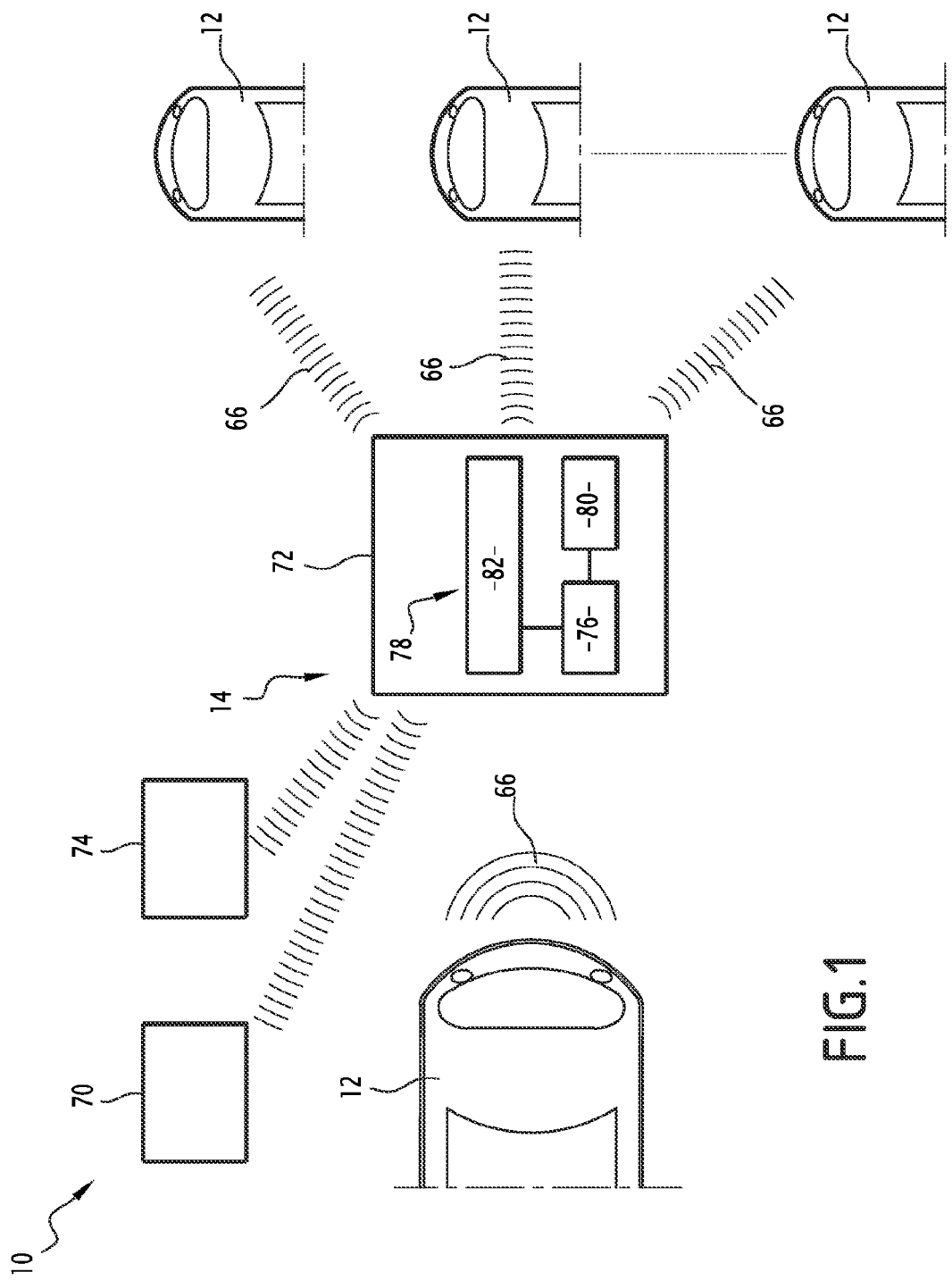
FIG. 1 is a diagrammatic view of an assembly including several guided ground vehicles according to the invention and an installation for managing the travel of each ground vehicle.

FIG. 1 shows an assembly 10 including several guided ground vehicles 12 and an installation 14 for managing the travel of each guided ground vehicle 12.

In the rest of the description, the terms "upstream" and "downstream" are to be understood relative to the direction of advance of each vehicle 12.

Figure 2:
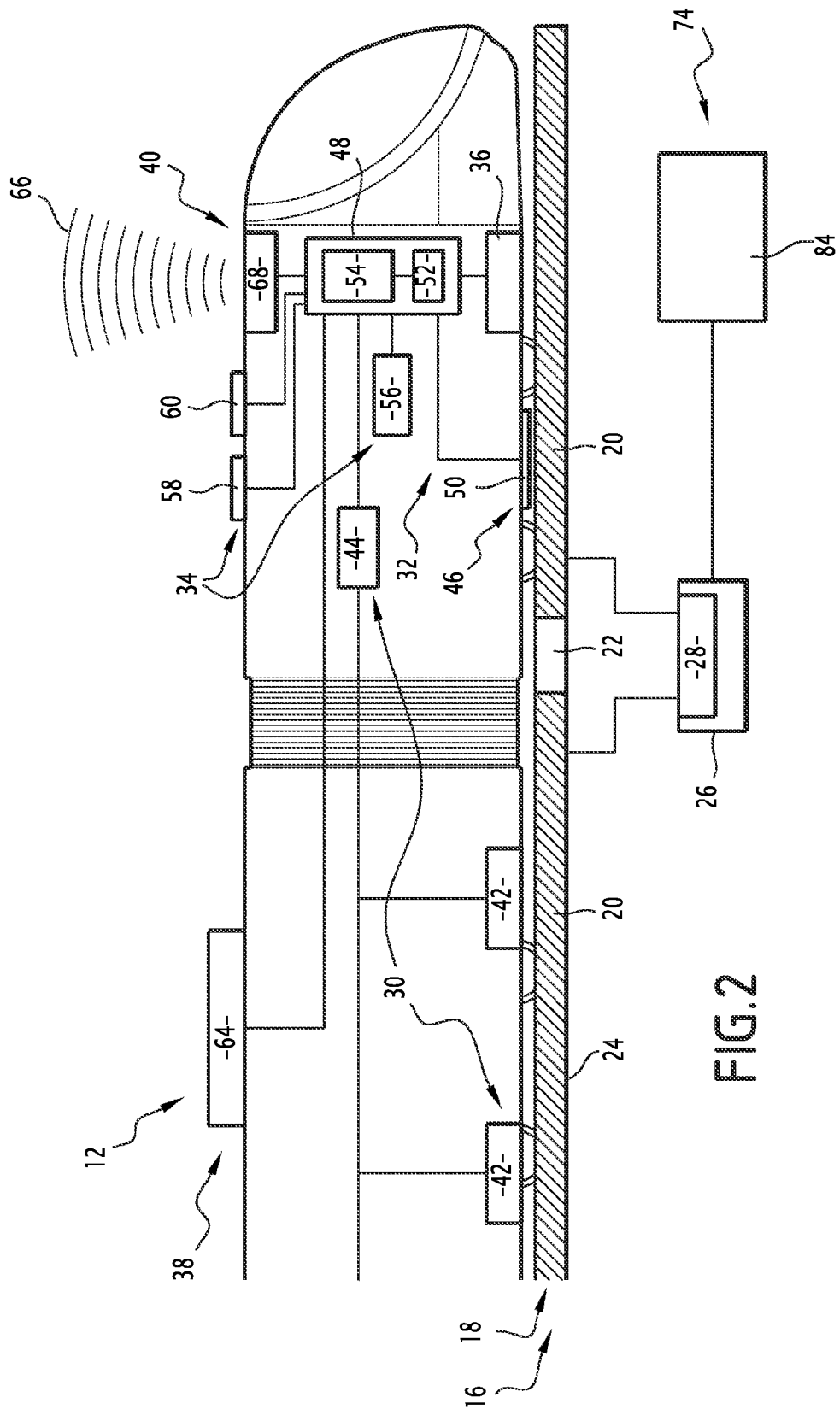
FIG. 2 is a diagrammatic view of one of the guided ground vehicles of FIG. 1.

Each guided ground vehicle 12 is adapted to travel on a track 16, as illustrated in FIG. 2. In the example embodiment of FIG. 2, each guided ground vehicle 12 is a tramway of the street-level power supply type. The track 16 includes, as is known in itself, two parallel guide rails (not shown in the figures), and one electrical contact rail 18 of the vehicles 12 extending between the two guide rails, parallel thereto.

The contact rail 18 includes a sequence of conductive segments 20 and isolating segments 22 positioned alternating on a support surface 24. In the example embodiment of FIG. 2, three conductive segments 20 are positioned across from a vehicle 12, while only two conductive segments 20 are shown in FIG. 2.

In a known manner, each conductive segment 20 is part of an electrical circuit designed to supply a power supply current to the vehicles 12. To that end, each conductive segment 20 is connected to at least one power supply unit 26, as illustrated in FIG. 2.

Each power supply unit 26 comprises an electrical signal receiver, not shown in the figures. Each power supply unit 26 further comprises an electric switching member 28 connected on the one hand to the electronic signal receiver, and on the other hand to each associated electrical circuit 20. Thus, each electrical circuit 20 is connected to at least one switching member 28. In the example embodiment of FIG. 2, each electrical circuit 20 is connected to a switching member 28, the switching member 28 of each power supply unit 26 being connected to two adjacent electrical circuits 20.

Each switching member 28 comprises an upstream switching member connected to the upstream electrical circuit 20 and a downstream switching member connected to the downstream electrical circuit 20. The upstream or downstream switching member is formed by at least one electrical contactor adapted to open or close the associated electrical circuit.

As shown in FIG. 2, each guided ground vehicle 12 comprises generating means 30 for generating a control signal for one of the electric switching members 28, and a device 32 for managing a derailment of the vehicle 12, connected to the generating means 30. Each guided ground vehicle 12 advantageously further comprises visual and/or sound alert means 34 inside and/or outside the vehicle 12, braking means 36 for braking the vehicle, storage means 38 for storing electricity, and communication means 40, connected to the device 32.

In a known manner, the control signal of one of the electric switching members 28 is generated by the generating means 30 periodically, at a frequency for example substantially equal to 2 microseconds (µs). Furthermore, the signal generated by the generating means 30 are adapted to control the or one of the switching member(s) 28 connected to the or one of the electrical circuit(s) 20 positioned across from the vehicle 12, to close that electrical circuit 20. In the example embodiment of FIG. 2, the signal generated by the generating means 30 is adapted to control the switching member 28 connected to the electrical circuits 20 positioned across from the vehicle 12 at the moment in question, more specifically below said vehicle. More specifically, in this example, the signal generated by the generating means 30 is adapted to control the downstream contactor of the switching member 28 connected to the downstream electrical circuit 20, so as to power the conductive segment positioned below the vehicle 12.

The generating means 30 include at least one antenna 42 for transmitting the control signal from the downstream switching member 28, and an electrical power supply module 44 of the antenna 42. In the example embodiment of FIG. 2, the generating means 30 include two transmission antennas 42, each antenna 42 being connected to the power supply module 44.

The device 32 includes detecting means 46 for detecting the derailment of the vehicle 12. The device 32 further includes an information processing unit 48, connected to the detecting means 46.

In the example embodiment of FIG. 2, the detecting means 46 include an inductive sensor 50, traditionally known. The inductive sensor 50 is arranged below the vehicle 12 and is adapted to measure a distance between the vehicle 12 and one of the guide rails of the track 16. The inductive sensor 50 is further adapted to compare the value of the measured distance to a predetermined threshold value.

Alternatively, the detecting means 46 include an optical sensor, for example of the infrared type, a magnetic sensor or a sensor of the accelerometer type. Traditionally, the processing unit 48 is formed by a memory 52 associated with a data processor 54.

The processor 54 is connected to the detecting means 46, the generating means 30, the visual and/or sound alert means 34, the braking means 36, the energy storage means 38 and the communication means 40. The processor 54 is adapted to deactivate the generating means 30, so as to inhibit the generation of the control signal. In the example embodiment of FIG. 2, the processor 54 is connected to the electrical power supply module 44 and is adapted to generate a signal commanding the stop of the module 44.

In one preferred example embodiment, the processor 54 uses a safe method for generating a control signal to stop the module 44, so as to be compatible with the safety level required by railroad standards.

Figure 3:
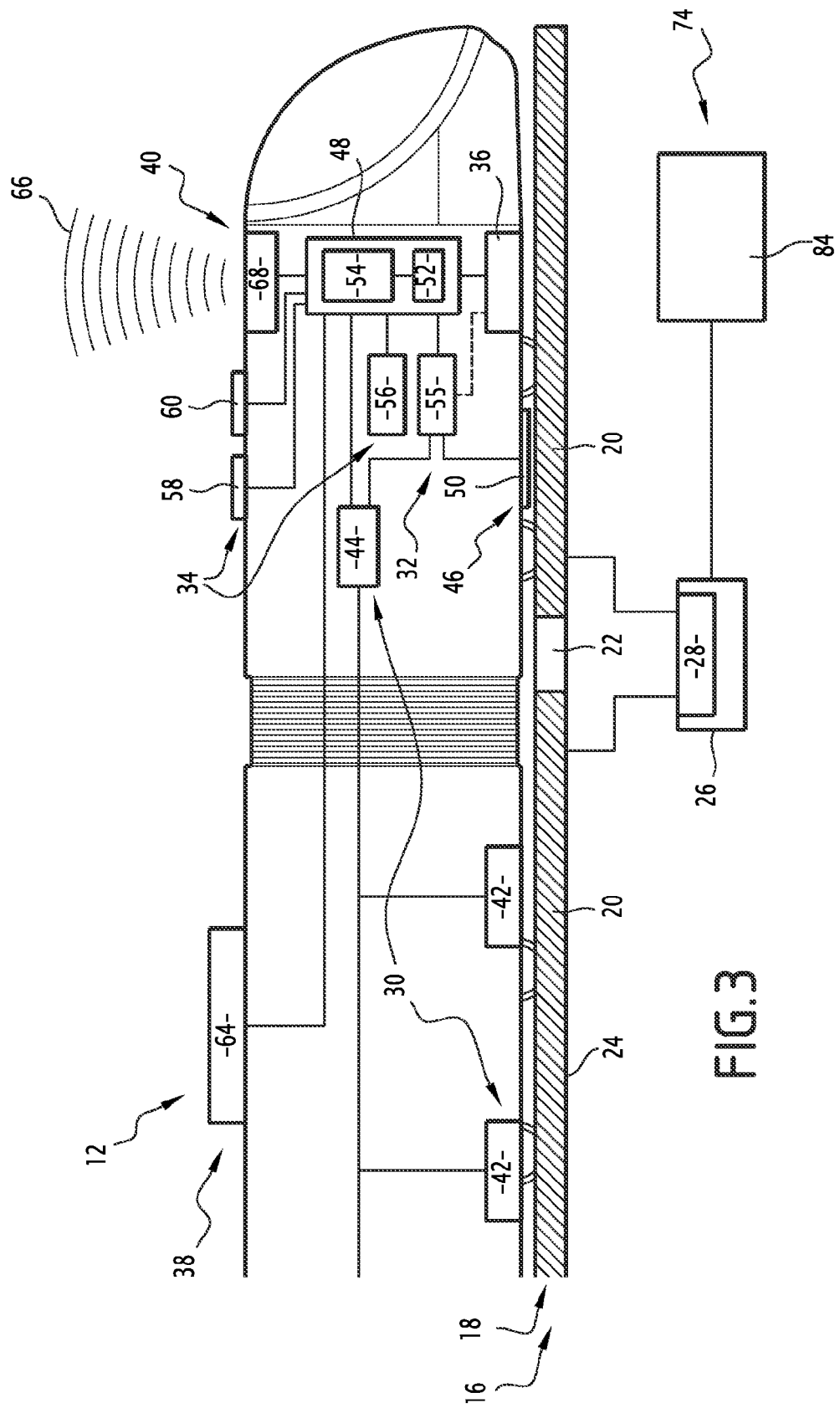
FIG. 3 is a view similar to that of FIG. 2, according to an alternative embodiment.

Alternatively, the device 32 for managing the derailment includes a device 55 for switching safely, of the type making up secure relays, connected on the one hand to the detecting means 46, and on the other hand to the electrical power supply module 44, as shown in FIG. 3. According to this alternative, the safe switching device 55 is adapted to generate a control signal to stop the module 44 reliably and in a very short length of time, given the type of component used. Also alternatively or additionally, the safe switching device 55 is connected to the braking means 36, as shown in dotted lines in FIG. 3, so as to actuate safe braking of the vehicle reliably and in a very short amount of time.

The processor 54 is further advantageously adapted to generate a control signal for the visual and/or sound alert means 34, a control signal for the braking means 36 and a control signal for discharging the electricity contained in the energy storage means 38. The processor 54 is also adapted to develop a message indicating the derailment of the vehicle 12, after the detecting means 46 have detected the derailment of the vehicle 12.

In the example embodiment of FIG. 2, the visual and/or sound alert means 34 include a first sound alarm device 56, a second sound alarm device 58 and a visual alert device 60, connected to the processor 54.

In the example embodiment of FIG. 2, the braking means 36 comprise a safe braking module adapted to activate safe braking of the vehicle 12.

As illustrated in FIG. 2, the energy storage means 38 for example comprise a battery power supply 64, permanently fastened on the roof of the vehicle 12. The battery power supply 64 for example includes modules made up of different accumulators. The battery power supply 64 is adapted to recover and store the braking energy of the vehicle 12, as known per se.

The communication means 40 are adapted to use a data link 66 to send the installation 14 a message indicating the derailment of the vehicle 12. In the example embodiment of FIGS. 1 and 2, the data link 66 is a wireless link according to standard CEM 50-121, standard EN 50159 on signaling-telecommunication and processing-safety communication systems on transmission systems, as well as for transmission levels with standard ETSI 300 330 for frequencies below 30 MHz and ETSI 300 340 for frequencies above 30 MHz.

The communication means 40 comprise a wireless signal transceiver 68.

The first sound alarm device 56 is arranged inside the vehicle 12, and the second sound alarm device 58 is arranged outside the vehicle 12.

Traditionally, the visual alert device 60 is adapted to transmit a lighted alert signal outside the vehicle 12.

As shown in FIG. 1, the installation 14 for managing the travel of each guided ground vehicle 12 includes several signaling devices 70, although only one signaling device 70 is shown in FIG. 1 for clarity reasons. The installation 14 also comprises a remote communication center 72 and a system 74 for supplying electricity for power supply units 26, and therefore the electrical circuits 20 of the contact rail 18.

Traditionally, each signaling device 70 has one signaling state from among several predetermined signaling states. Each signaling device 70 is for example formed by a signal lamp and has several possible lighted states corresponding to different physical states of the lamp.

The remote communication center 72 comprises a control device 76 for controlling the signaling devices 70 and the electric power supply system 74. The communication center 72 also comprises data transceiver means 78 and location means 80 for locating each vehicle 12.

The electric power supply system 74 includes an electrical power supply device 84 connected to each electrical power supply unit 26, as illustrated in FIG. 2. The power supply device 84 is adapted to supply electrical current to each power supply unit 26, for the general electrical supply of the contact rail 18.

The control device 76 is connected to the data transceiver means 78 and the location means 80 and is adapted to generate a signal modifying the signaling state of at least one of the signaling devices 70, based on the reception of a message indicating the derailment of a vehicle 12. In the example of FIG. 1, the control device 76 is adapted to generate a signal modifying the signaling state of a single device 70 arranged near a derailed vehicle 12.

The control device 76 is adapted to also generate a control signal stopping the electrical power supply system 74, based on the receipt of a message indicating the derailment of a vehicle 12.

The control device 76 is adapted to further develop a message recommending a speed limit or definitive stop for at least one of the vehicles 12, based on the receipt of a message indicating the derailment of a vehicle 12. Additionally, the control device 76 is adapted to attach the location of a derailed vehicle 12 to that message.

The control device 76 is adapted to also generate an alert message in order to activate an operation by a team able to record the area of the track 16 where the derailment has occurred, an response team to assist passengers of the derailed vehicle 12, and a maintenance team able to work on the track 16 to restore it to service.

The data transceiver means 78 are adapted to receive a message indicating the derailment of a derailed vehicle 12 from the communication means 40 of each vehicle 12, via each data link 66. The data transceiver means 78 are further adapted to retransmit that message on each of the other data links 66 to the other vehicles 12 of the set 10. They are lastly adapted to transmit the signal modifying the signaling state of at least one of the signaling devices 70, the control signal to stop the electric power supply system 74, as well as the message recommending a speed limit or a definitive stop for at least one of the vehicles 12. In the example embodiment of FIG. 1, the data transceiver means 78 comprise a wireless signal transceiver 82.

The location means 80 for example comprise means for processing location data, that data for example being in the form of a database, said data being received from each vehicle 12, so as to determine and update the location of each vehicle 12 of the set 10 in real time.

The operation of the device 32 for managing the derailment according to the invention will now be explained.

Figure 4:
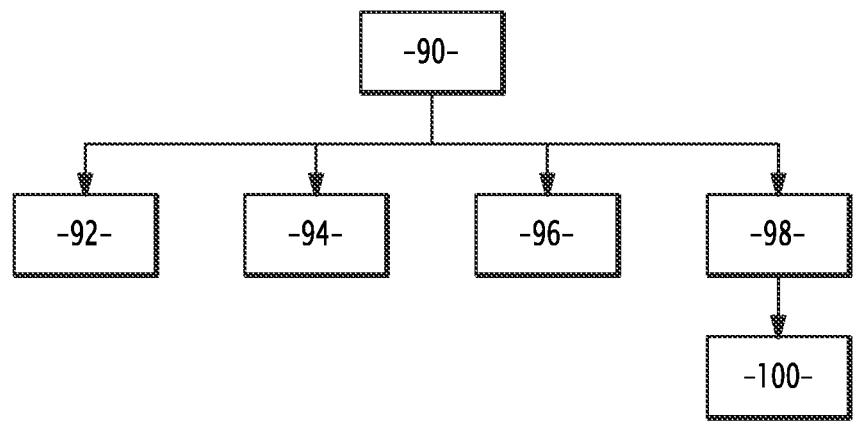
FIG. 4 is a flowchart showing a method according to the invention for managing a derailment.

FIG. 4 shows the steps of a method for managing the derailment according to an embodiment of the invention, carried out by the management device 32 of one of the vehicles 12.

Initially, the vehicle 12 travels on the track 16, and the electrical circuit 20 positioned centrally across from the vehicle 12 in FIG. 2 is closed. It is assumed that at a given moment, the vehicle 12 derails, thereby making the electrical circuit 20 at least partially accessible to any pedestrians.

During an initial step 90, the detecting means 46 detect the derailment of the vehicle 12. In the example embodiment of FIG. 2, the inductive sensor 50 detects the derailment of the vehicle 12 by measuring a distance between the vehicle 12 and one of the guide rails of the track 16 and comparing the value of that measurement to a predetermined threshold value or to a predetermined value range. The sensor 50 sends the processor 54 a signal indicating the derailment of the vehicle 12.

During a following step 92, the processor 54 deactivates the generating means 30, so as to inhibit the generation of the control signal. In the example embodiment of FIG. 2, in order to perform that deactivation, the processor 54 generates a control signal stopping the electrical power supply module 44, then sends that signal to the module 44. Alternatively, that deactivation is done by the safe switching device 55.

The two antennas 42 no longer being powered by the module 44, they then cease to transmit the control signal from the downstream switching member 28 connected to the electric circuit 20 positioned centrally across from the vehicle 12. The electronic signal receiver of the associated power supply unit 26 no longer receives a control signal from the downstream switching member 28, thus causing the opening of the electrical circuit 20 positioned centrally across from the vehicle 12. This makes it possible to impose a zero electrical potential on the electrical circuit 20, and thus to prevent any pedestrians from exposure to electricity of the circuit 20 due to the derailment of the vehicle 12.

During a step 94 carried out in parallel with step 92, the processor 54 generates a control signal to discharge electricity contained in the energy storage means 38, then send that signal to the energy storage means 38. "Step carried out in parallel with another step" means that both steps have a same initial triggering condition, without necessarily being done synchronously. Thus, steps 92 and 94 are carried out following the end of the initial step 90.

In the example embodiment of FIG. 2, during step 94, the processor 54 generates a control signal for discharging the electricity contained in the battery power supply 64. The battery power supply 64 is then discharged, which makes it possible to reduce the risk of subsequent fire of the battery 64, which may lead to property damage and/or human injury. During step 94, no energy storage system other than the storage means 38 designed to supply electricity to the vehicle 12 is discharged by the processor 54. In particular, the processor 54 does not send a discharge signal to any energy storage system powering any heat regulating device arranged within the vehicle 12.

During a step 96 carried out in parallel with steps 92 and 94, the processor 54 develops a message indicating the derailment of the vehicle 12, then sends that message to the communication means 40. The wireless signal transceiver 68 then uses the data link 66 to send the installation 14 the message indicating the derailment of the vehicle 12.

During a step 98 carried out in parallel with steps 92, 94 and 96, the processor 54 generates a control signal for the visual and/or sound alert means 34, then processes the signal using the visual and/or sound alert means 34. In the example embodiment of FIG. 2, the processor 54 generates a control signal of the first sound alarm device 56, the second sound alarm device 58 and the visual alert device 60. The first sound alarm device 56, the second sound alarm device 58, respectively, then emits a sound signal to the inside of the vehicle 12, the outside of the vehicle 12, respectively. The visual alert device 60 emits a lighted alert signal outside the vehicle 12. This step makes it possible to alert passengers and the driver of the vehicle 12, as well as other users of the track 16.

During a step 100 carried out following step 98, the processor 54 generates a control signal for the braking means 36, then send that signal to the braking means 36. In the example embodiment of FIG. 2, the processor 54 generates a control signal of the safety braking module included in the braking means 36, causing safe braking of the vehicle 12.

Alternatively, this control of the braking means 36 is done by the safe switching device 55.

The sound signal emitted by the first sound alarm device 56 inside the vehicle 12, during the preceding step 98, advantageously allows passengers and the driver of the vehicle 12 to prepare before the safety braking of the vehicle 12.

Figure 5:
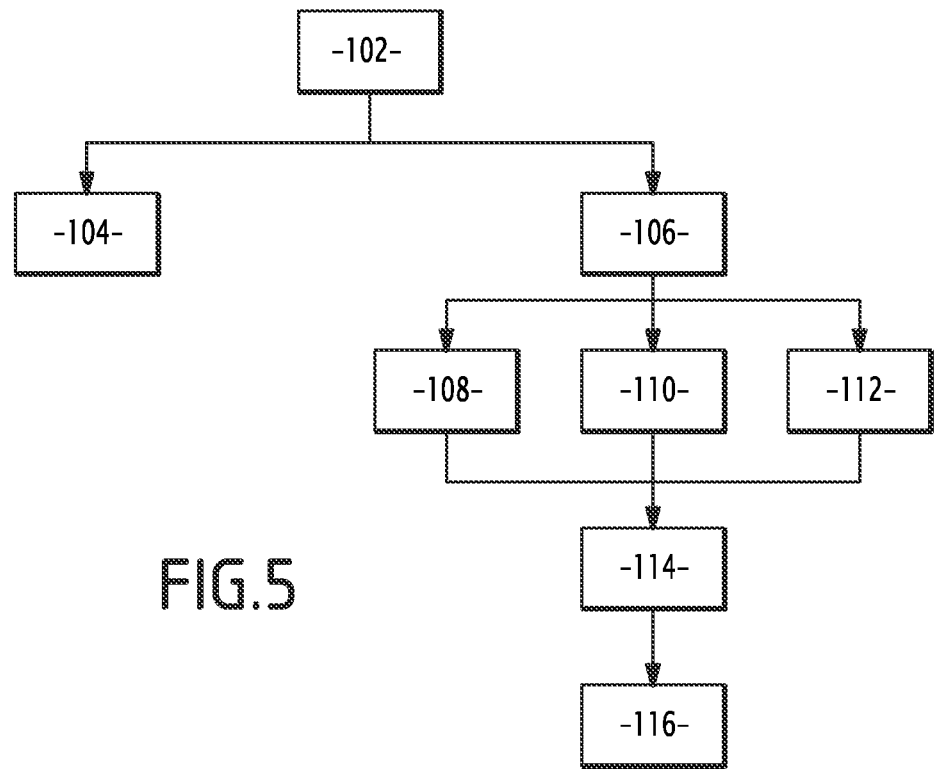
FIG. 5 is a flowchart showing the operation of the management installation of FIG. 1, according to the invention.

The operation of the installation 14 for managing the travel of each guided ground vehicle 12 will now be explained, in light of steps 102 to 116 shown in FIG. 5.

During a step 102 carried out after step 96, the transceiver means 78 of the remote communication center 70 receive messages indicating the derailment of the derailed vehicle 12, via the associated data link 66. The transceiver means 78 then send that message to the control device 76, then retransmit that message on each of the other data links 66. This makes it possible to inform the other vehicles 12 of the set 10 that one of the vehicles 12 has derailed.

During a following step 104, the control device 76 generates a control signal to stop the electrical power supply system 74. The electrical power supply device 84 then ceases to supply electrical current to each power supply unit 26, and the contact rail 18 is no longer electrically powered.

During a step 106 carried out in parallel with step 104, the location means 80 determine the geographical position of the derailed vehicle 12, and send that geographical position to the control device 76.

During a step 108 carried out after step 106, the control device 76 generates a signal to modify the signaling state of at least one of the signaling devices 70. Preferably, the control device 76 generates a signal modifying the signaling state of at least one signaling device 70 arranged near the derailed vehicle 12. In the example embodiment of FIG. 1, the control device 76 generates a signal modifying the signaling state of the signaling device 70 arranged near the derailed vehicle 12.

During a step 110 carried out in parallel with step 108, the control device 76 sends the transceiver means 78 a message recommending a speed limit or definitive stop for at least one of the other vehicles 12. In the example embodiment of FIG. 1, the control device 76 sends the transceiver means 78 a message recommending a speed limit for each vehicle 12 of the set 10, and a definitive stop for the or each vehicle 12 that may be located near the derailed vehicle 12. The transceiver means 78 than transmit that message to each vehicle 12. Alternatively, the control device 76 attaches the location of the derailed vehicle 12 to that message, and sends that location, jointly with the message, to the transceiver means 78.

During a step 112 carried out in parallel with steps 108 and 110, the control device 76 generates an alert message in order to activate an intervention by a team able to record the area of the track 16 where the derailment has occurred.

During a next step 114 carried out following one of steps 108 to 112, the control device 76 generates an alert message in order to activate an intervention by an emergency response team for the passengers of the derailed vehicle 12.

During a final step 116, the control device 76 generates an alert message in order to trigger an intervention by a maintenance team able to operate on the track 16 to restore it to service.

Alternatively, step 114 for planning an intervention by an emergency response team and step 116 for planning an intervention by a maintenance team are carried out simultaneously.

Alternatively or additionally, at least one vehicle 12 situated near the derailed vehicle 12 receives the message indicating the derailment directly from the communication means 40 of that vehicle 12. The message indicating the derailment is then sent directly by the derailed vehicle 12 to the vehicle 12 situated nearby, without going through the remote communication center 72. The time to communicate the derailment information to that vehicle 12 is thus advantageously reduced.

In the method for managing the derailment of a guided ground vehicle 12 according to the invention, the management device 32 detects the derailment automatically. This makes it possible to ensure reliable detection of the derailment.

By automatically activating the braking means 36 after detecting the derailment of the vehicle 12, the method for managing the derailment according to the invention further makes it possible to ensure reliable emergency braking of the vehicle 12.

Owing to the transmission of a message indicating the derailment of the vehicle 12, the management method according to the invention also makes it possible to warn and alert the other vehicles 12 in the set 10, as well as to activate the intervention by material and human resources. This makes it possible to improve the speed of intervention and the organization of emergency assistance following the derailment.

The method for managing the derailment of a guided ground vehicle 12 according to the invention advantageously makes it possible to reduce the risk of collision between the derailed vehicle 12 and the other vehicles 12 in the set 10. Furthermore, owing to the deactivation of the energy storage means, and the activation of the visual and/or sound alert means, the management method according to the invention makes it possible to improve passenger, driver and/or pedestrian safety.

One can thus see that the method for managing the derailment of a guided ground vehicle 12 according to the invention makes it possible to improve the safety of pedestrians located near the track during the derailment of the vehicle 12, while ensuring reliable detection of the derailment.

The invention claimed is:

1. A method for managing a derailment of a guided ground vehicle traveling on a track, the track comprising an electric contact rail for supplying electricity to the vehicle via the ground, the rail including a plurality of electrical circuits, each electrical circuit being connected to at least one electric switching member,
   the method being implemented by an onboard device within the vehicle, the device including a detector and a processing unit connected to the detector, wherein the detector operates to detect the derailment of the ground vehicle, the vehicle including generating means for generating a control signal for controlling the at least one electric switching member connected to at least one of the plurality of electrical circuits positioned across from the ground vehicle, to close said electrical circuit, the generating means being connected to the processing unit,
   the method including detecting, by the detector, the derailment of the ground vehicle, wherein, after detection of derailment by the detector, the processing unit deactivates the generating means so as to inhibit the generation of the control signal, in order to cause the opening of the circuit(s) across from the vehicle.

2. The method according to claim 1, wherein the generating means include at least one transmission antenna for transmitting the control signal and one electrical power supply module for supplying electric power to the antenna, and during the deactivation step, the processing unit is adapted to generate a control signal to stop the electrical power supply module.

3. The method according to claim 1, wherein the vehicle comprises a visual and/or sound alert device for alerting inside and/or outside the vehicle, connected to the processing unit, and the method further includes a step for generating, by the processing unit, a control signal for controlling said alert device, and for sending said signal for controlling said alert device to the alert device after the detection of the derailment of the vehicle.

4. The method according to claim 3, wherein the vehicle comprises a brake for braking the vehicle, connected to the processing unit, and the method further includes a step for generating, by the processing unit, a braking control signal, the step for generating a braking control signal being carried out after the step for generating a control signal for controlling said alert device inside the vehicle.

5. The method according to claim 1, wherein the vehicle comprises storage means for storing electricity, connected to the processing unit, and the method further includes a step for generating, by the processing unit, a control signal to discharge the electricity contained in the storage means, and for sending said signal to discharge the electricity to the storage means after the detection of the derailment of the vehicle.

6. The method according claim 1, wherein the vehicle comprises communication means, connected to the processing unit, and the method further includes a step for elaborating, by the processing unit, a message indicating the derailment of the vehicle, and for sending said message to the communication means after the detection of the derailment of the vehicle.

7. A guided ground vehicle able to travel on a track, the track comprising an electrical contact rail of the vehicle supplying electricity via the ground, the rail including a plurality of electrical circuits, each electrical circuit being connected to at least one electric switching member,
the vehicle including an onboard device for managing a derailment of the vehicle and generating means for generating a control signal for controlling the electric switching member(s) connected to one or more electrical circuits positioned across from the ground vehicle, to close said electrical circuit,
the device including a detector and a processing unit connected to the detector and the generating means, wherein the detector operates to detect the derailment of the ground vehicle,
wherein the processing unit is adapted to deactivate the generating means to inhibit the generation of the control signal, in order to cause the opening of the circuit(s) across from the vehicle.

8. The vehicle according to claim 7, wherein the vehicle comprises communication means, connected to the processing unit, and the processing unit is adapted to elaborate a message indicating the derailment of the vehicle and to send this message to the communication means after the detection of the derailment of the vehicle.

9. A set including, in combination, a plurality of guided ground vehicles each constructed according to claim 8 and an installation for managing the travel of each guided ground vehicle,
each guided ground vehicle receiving electricity via the electrical contact rail,
the installation including a remote communication center,
wherein each guided ground vehicle is adapted to communicate with the remote communication center via a data link, the communication means of each guided ground vehicle being adapted to send a message indicating the derailment of one guided ground vehicle to the remote communication center via the data link.

10. The set according to claim 9, wherein the installation further includes a plurality of signaling devices, each signaling device having a signaling state from among a plurality of predetermined signaling states, and the remote communication center comprises control means for controlling each signaling device, the control means being adapted to generate a signal modifying the signaling state of at least one of the signaling devices, based on the receipt of the message indicating the derailment of the one guided ground vehicle.

11. The set according to claim 9, wherein the installation further includes a power supply system for supplying electric power to the electrical circuits of the contact rail, and the remote communication center comprises control means for controlling the power supply system, the control means being adapted to generate a control signal to stop the power supply system, based on the receipt of the message indicating the derailment of the one guided ground vehicle.

12. The set according to claim 9, wherein the remote communication system comprises location means for locating each guided ground vehicle, and a transceiver for sending the location of the one guided ground vehicle that has derailed to other guided ground vehicles.

* * * * *